United States Patent

[11] 3,622,345

[72] Inventor Monoj K. Gupta
 Cincinnati, Ohio
[21] Appl. No. 147,310
[22] Filed June 9, 1971
[45] Patented Nov. 23, 1971
[73] Assignee The Procter & Gamble Company
 Cincinnati, Ohio
 Continuation-in-part of application Ser. No. 876,114, Nov. 12, 1969, now abandoned. This application June 9, 1971, Ser. No. 147,310

[54] PROPYLENE GLYCOL MONOESTER EMULSIFIER-CONTAINING SHORTENINGS AND CAKE MIXES CONTAINING THE SAME
 14 Claims, No Drawings
[52] U.S. Cl. ................................................. 99/94, 99/92, 99/118, 99/123
[51] Int. Cl. ................................................. A23d 5/00, A21d 13/08
[50] Field of Search ........................................... 99/92, 118, 123, 94

[56] References Cited
 UNITED STATES PATENTS

| | | | |
|---|---|---|---|
| 3,145,107 | 8/1964 | Howard.......................... | 99/118 |
| 3,145,108 | 8/1964 | Howard.......................... | 99/118 |
| 3,145,109 | 8/1964 | Howard.......................... | 99/118 |
| 3,228,772 | 1/1966 | Buddemeyer et al. ......... | 99/94 |
| 3,429,714 | 2/1969 | Nelson .......................... | 99/118 |

*Primary Examiner*—Joseph M. Golian
*Attorneys*—Edmund J. Sease and Richard C. Witte

ABSTRACT: Particular emulsifier-containing shortenings are suitable for use in cake mixes which are shelf stable and which can be utilized to provide high-specific volume, good grain structure, excellent eating quality cakes. These shortenings have a relatively high-solids content at room temperature, a relatively low-solids content at mouth temperature and some solids content at the highest temperatures encountered during storage. The shortenings comprise a propylene glycol monoester emulsifier with a particular ratio of fatty acid ester chains to provide high specific volume cakes.

PROPYLENE GLYCOL MONOESTER EMULSIFIER-CONTAINING SHORTENINGS AND CAKE MIXES CONTAINING THE SAME

CROSS-REFERENCE TO A RELATED APPLICATION

This application is a continuation-in-part of copending application Ser. No. 876,114, filed Nov. 12, 1969, and now abandoned.

BACKGROUND OF THE INVENTION

So-called "dry" prepared mixes used for baking are made by combining sugar, flour, shortening, and other ingredients including leavening, milk solids, egg solids, flavoring and coloring, to form a free-flowing granular mixture. To prepare these dry mixes for baking, liquid materials such as water, milk and eggs are added and the combination is beaten to form a homogenous mixture and incorporate air. The resulting batter is then baked. The present invention relates particularly to a shortening ingredient for use in a dry prepared cake mix.

The shortening ingredient in a dry prepared cake mix ordinarily comprises an emulsifier component and a fatty triglyceride component.

Various emulsifiers are known for use in dry prepared cake mixes and for use as components of the shortening ingredient for these mixes. These emulsifiers are used to aid in the incorporation of air during batter mixing to form a high-volume batter emulsion and to stabilize this emulsion during baking so as to provide a baked cake of large volume and fine grain structure. For example, Howard U.S. Pat. Nos. 3,145,107, 3,145,109 disclose shortenings containing such emulsifier components. The shortenings of the Howard patents provide cakes of large volume and fine grain structure even when "single-stage batter mixing" is utilized. In this single-stage mixing operation, all the cake ingredients are simultaneously mixed together in the mixing container as distinguished from multistage "creaming" or "blending" methods often used in cake batter preparation.

The fatty triglyceride component in the shortening ingredient ordinarily is a plastic shortening with a small solids content index (SCI)* (*SCI values are measured herein by the dilatometric method of Fulton, Lutton and Wille, *J.A.O.C.S.* 31, 98 (1954). They are a measure of the amount of solids present in the shortening at a particular temperature.) spread between room temperature and mouth temperature. Shortenings with high SCI values are desirably used in dry prepared cake mixes because they furnish keeping qualities to the mixes; in other words, as a result of the use of high SCI shortenings, the mixes are shelfstable and retain their ability to be processed into acceptable cakes despite storage after production for long periods of time at relatively high temperatures. The use of a shortening with a small solids content index spread between room temperature and mouth temperature has the disadvantage that the ultimate cake does not have a moist eating quality or a melt-in-the-mouth eating quality. A moist eating quality is that quality ordinarily furnished by the use of a liquid shortening or oil as the shortening ingredient in cake preparation. A melt-in-the-mouth eating quality is that quality ordinarily furnished by the use of butter or margarine in cake preparation. The melt-in-the-mouth effect is a cooling sensation caused in the mouth by the rapid melting in the mouth of the butter or margarine ingredients due to the fact that is has a relatively high-solids content at room temperature and a relatively low-solids content at mouth temperature, that is, due to the fact that it has a relatively large solids content index (SCI) spread between room temperature and mouth temperature. Liquid shortenings, oils, butter, and margarine are unsuitable for use in dry prepared cake mixes since the cake mixes prepared utilizing these shortening ingredients are deficient from a shelf stability standpoint.

It has long been desired to optimize the eating quality of cakes while preserving the high specific volumes* (*The term "specific volume" refers to the volume of a baked cake per unit weight of dry prepared mix.) for use in a dry prepared cake mix to provide mix keeping qualities, good air incorporation during batter mixing, good batter stability during baking, and a rapid melt-in-the-mouth, that is, butterlike-eating quality, and also a moist eating quality in the ultimate cake. In other words, it is an object of the invention to provide a shortening which is suitable for use in a dry prepared cake mix which is shelf stable, which can be utilized with single-stage batter mixing to provide a cake with high-specific volume and fine grain structure, and to provide an ultimate cake of excellent eating quality in the sense that it gives a particular eating effect which can be described as moist and rapid melt-in-the-mouth or butterlike.

SUMMARY OF THE INVENTION

Briefly stated, the above object is obtained with novel emulsifier-containing shortenings which have a relatively high-solids content at room temperature, a relatively low-solids content at mouth temperature, and some solids content even at the highest temperatures encountered during storage, for example, 105° F. These shortenings have solids content index values ranging from 10 to 40 at 70° F., 10 to 30 at 80° F., 5 to 20 at 92° F., and 0.5 to 10 at 105° F., and have a solids content index value spread between 70° F. and 92° F. of at least 8 SCI units. These shortenings comprise by weight from 67 percent to 94 percent of basestock component consisting essentially of a triglyceride constituent the triglyceride constituent having SCI values ranging from 10 to 40 at 70° F., 5 to 35 at 80° F., 0.5 to 25 at 92° F., and 0 to 10 at 105° F.; from 1 to 8 percent triglyceride hardstock component having an iodine value (IV) less than 10; and from 5 to 25 percent of particular emulsifier component. The emulsifier component consists essentially by weight of from 50 to 100 percent monoester of propylene glycol with saturated fatty acid having from 12 to 22 carbon atoms in each of the fatty acid chains and from 0 to 50 percent of fatty monoglyceride having saturated fatty acid ester chains and from 12 to 22 carbon atoms in each of these fatty acid ester chains. The monoester of propylene glycol has at least 60 weight percent of its fatty acid ester chains expressed as acids either derived from stearic acid or from palmitic acid with the weight ratio of stearic acid ester chains (expressed as acids) to palmitic acid ester chains (expressed as acids) ranging from 1:1 to 2.5:1.

DETAILED DESCRIPTION OF THE INVENTION

Preferably, the novel shortenings of this invention have solids content index values ranging from 15 to 35 at 70° F., 12 to 28 at 80° F., 5 to 20 at 92° F., and 1 to 6 at 105° F. and have a solids content index value spread between 70° and 92° of at least 10 SCI units. Moreover, these shortenings preferably comprise by weight from 74 to 92 percent basestock component, from 2 to 6 percent of triglyceride hardstock component, and from 6 to 20 percent of emulsifier component.

The SCI spread of at least 8 SCI units between 70° F. and 92° F. in the novel shortening compositions of this invention is essential to provide the melt-in-the-mouth eating quality to the ultimate cakes made utilizing these shortening compositions. This is because the decrease in solids content between room temperature (represented by 70° F.) and mouth temperature (represented by 92° F.) provides a cooling sensation in the mouth due to the absorption of heat of crystallization from the mouth by the shortening composition as the solids content of the shortening decreases. The solids content index of not more than 20 at 92° F. in the novel shortening compositions of this invention is essential to provide a moist eating quality in the ultimate cake since most of the shortening in the ultimate cake is liquid at mouth temperature with this SCI upper limit at 92° F. The solids content index of at least 0.5 at 105° F. in the novel shortening compositions of this invention is essential to assure that the dry prepared cake mix with one of these compositions as a shortening ingredient is shelf stable. The other SCI value limits are essential to provide the required SCI spread, SCI value upper limit at 92° F. and SCI value lower limit at 105° F.

Turning now to the basestock component of the present shortening, this basestock component consists essentially of triglyceride constituent. The basestock component also includes nonhardstock impurities, if any, present with the emulsifier component as a result of the method of preparation of the emulsifier component as explained hereinafter.

At least 67 percent by weight basestock component is utilized so that the shortening will contribute a moist eating quality to the ultimate cake. No more than 94 percent by weight basestock component is utilized so that there is room in the formula for the hardstock component which provides a mix with shelf stability and the emulsifier component which enables the production of a high-specific volume fine grain structure cake. The SCI values specified for the basestock triglyceride constituent are essential to achieve the SCI values in the shortening composition which are necessary for mix shelf stability and the moist eating quality and melt-in-the-mouth eating quality in the ultimate cake.

The basestock triglyceride constituent can be prepared by any method that gives a triglyceride shortening with the required previously specified SCI values. It can be prepared, for example, starting out with a single vegetable or other edible oil processing this oil so as to obtain the required SCI values; alternatively, it can be prepared by blending two or more triglyceride components to obtain the required SCI values.

For example, suitable basestock triglyceride constituent can be obtained by hydrogenating under nonselective conditions vegetable or marine oils having fatty acid chains with 12 to 22 carbon atoms, preferably 14 to 22 carbon atoms. This hydrogenation procedure is known to those skilled in the shortening art and in general utilizes pressures from atmospheric to 150 p.s.i., active catalyst (e.g., freshly activated nickel or nickel-zirconium catalyst), and high hydrogenation residence times (e.g., residence times ranging from 30 minutes to 4 hours). Vegetable oils which can be processed to give basestock triglyceride constituent for use herein include, for example, soybean oil, sunflower seed oil, corn oil, safflower seed oil, palm oil, and cottonseed oil. Marine oils which can be processed to give basestock triglyceride constituent for use herein are typified by sardine oil, herring oil, whale oil, menhaden oil, and mixtures thereof.

Basestock triglyceride constituent suitable for use in formulating the shortenings of this invention can also be prepared by hydrogenating the above oils to a moderate degree, e.g., to an IV ranging from 40 to 80, and then fractionating the hydrogenated product by fractional crystallization with or without solvent to recover a fraction having the required SCI values. For example, soybean oil can be hydrogenated to an IV of approximately 50 and the resulting product fractionated to provide a fraction having the required properties. Also, the above oils can be lightly hydrogenated, for example to an IV ranging from 80 to 105, and the lightly hydrogenated product can be fractionated to provide suitable basestock triglyceride constituent.

The basestock triglyceride constituent of the present invention can also be formulated by blending, for example, a triglyceride oil that is softer, that is, having a lower-solids content than required with one that is harder, that is, having a higher-solids content than is required, to provide a constituent having a proper SCI properties. For example, soybean oil which has been hydrogenated to an IV ranging from 80 to 90 or tallow or lard or mutton fat can be blended with a harder triglyceride oil, for example, soybean oil hydrogenated to an IV of 60 to 65. A preferred soft constituent for use in blending is soybean oil having a solids content of 11 at 70° F; this is conveniently prepared by hydrogenating soybean oil to an IV of 85 and then, if necessary, blending the resulting product with other soybean oil constituent to adjust the solids content index at 70° F. to 11. Another preferred soft component is tallow. A preferred hard component for blending is soybean oil having an SCI of 44 at 70° F.; this constituent is readily prepared by hydrogenating soybean oil to an IV of 60 to 65 and then, if necessary, blending the resulting hydrogenated product with other soybean oil constituent to adjust the solids content index at 70° F. to 44.

The triglyceride component with an IV less than 10 is denoted hardstock. Ordinarily this hardstock component contains fatty acid ester chains containing 12 to 22 carbon atoms, preferably containing 14 to 22 carbon atoms. At least 1 percent of this hardstock constituent is necessary in the shortening composition formula to assure that the dry prepared cake mix utilizing this shortening composition will have good shelf stability. If more than 8 percent of this hardstock constituent is used, the shortening composition ordinarily will not have the required SCI value at 92° F. and will not have the required SCI spread between 70° and 92° F. This hardstock constituent can be prepared by substantially fully hydrogenating vegetable oils and other edible triglycerides. Some hardstock constituent suitable for use herein may be present along with the emulsifier component as a result of the method of preparation of the emulsifier component as explained hereinafter. Hardstock constituent suitable for use herein includes substantially fully hydrogenated soybean oil, rapeseed oil, and tallow. Preferred hardstock constituent is substantially fully hydrogenated palm oil, cottonseed oil, or cottonseed stearin; that is, palm oil, cottonseed oil, or cottonseed stearin, each with an iodine value less than 10.

The level and type of the emulsifier component in the shortening provide the ultimate cake with high specific volume and fine grain structure as a result of aiding in the incorporation of air into the cake batter during batter mixing and stabilizing the aerated batter emulsion during baking of the cake. The emulsifier component also interacts with the basestock and hardstock components to provide the required solids content in the shortening to achieve a baked cake with melt-in-the-mouth eating quality and moist-eating quality and to achieve a dry prepared cake mix having good shelf stability.

The propylene glycol monoester* (*the terms "propylene glycol monester" and "monoester of propylene glycol" are used interchangeably herein.) component in the emulsifier can be conveniently prepared either by directly esterifying propylene glycol with fatty acid or more practically by interesterifying triglyceride with propylene glycol. This interesterification is conveniently carried out, for example, at temperatures ranging from 360° F. to 450° F. with the use of catalyst such as sodium hydroxide or lithium hydroxide. The product resulting from the interesterification reaction ordinarily is a crude product and contains monoglyceride, diglyceride, triglyceride, propylene glycol diester and free fatty acid in addition to monoester of propylene glycol. The monoester of propylene glycol and monoglyceride are emulsifier. The diglyceride, propylene glycol diester and free fatty acid are considered part of the basestock component. The triglyceride is considered part of the hardstock component. For example, in a typical interesterification reaction between triglyceride and propylene glycol, the product contains by weight 65 percent propylene glycol monoester, 12 percent monoglyceride, 8 percent diglyceride, 8 percent triglyceride, 5 percent propylene glycol diester, and 2 percent free fatty acid; the crude propylene glycol monoester in shortening No. 1 and shortening No. 2 hereinafter and in the examples hereinafter is estimated to contain these percentages of components.

The monoglyceride component is conveniently prepared by superglycerinating triglycerides, for example, utilizing temperatures ranging from 280° to 380° F. with the use of a catalyst such as sodium hydroxide or lithium hydroxide. The product resulting from this superglycerination technique ordinarily is a crude product containing, by weight, for example, 35 percent monoglyceride, 35 percent diglyceride, and 30 percent triglyceride; the crude monoglyceride in Shortening No. 1 and in examples I and II hereinafter is estimated to contain these percentages of components. The monoglyceride is emulsifier. The diglyceride is considered part of the basestock component. The triglyceride is considered part of the hardstock component.

Preferred propylene glycol monoesters contain 14 to 22 carbon atoms in their fatty acid chains. Very preferred propylene glycol monoesters can be derived from palm oil hydrogenated to an IV of less than 10 and from rapeseed oil hydrogenated to an IV of less than 10. Preferred monoglycerides contain 14 to 22 carbon atoms in their fatty acid chains. A very preferred monoglyceride is derived from rapeseed oil hydrogenated to an IV of less than 10.

As previously indicated, the propylene glycol monoester constituent of the emulsifier component are required to have at least 60 percent of its fatty acid ester chains expressed as acids derived either from stearic acid or from palmitic acid. This is because propylene glycol monopalmitate is especially useful in aiding in the incorporation of air during batter mixing, and propylene glycol monostearate is especially useful in stabilizing the aerated batter emulsion during baking. Air incorporation and aerated batter emulsion stabilization are important if a high specific volume fine grain structure cake is to be produced with single-stage batter mixing. Preferably, the propylene glycol monoester constituent has at least 80 percent of its fatty acid ester chains expressed as acids derived either from stearic or palmitic acid.

As previously stated, the propylene glycol monoester constituent of the emulsifier component is required to contain fatty acid ester chains such that the weight ratio of stearic acid ester chains (expressed as acids) to palmitic acid ester chains (expressed as acids) ranges from 1:1 to 2.5:1. Preferably the ratio ranges from 1.2:1 to 2:1. If the ratio is less than 1:1, the aerated batter emulsion is not sufficiently stabilized during baking. If the ratio exceeds 2.5:1 sufficient air will not be incorporated during batter mixing when single stage mixing is utilized. If the aerated batter emulsion is not sufficiently stabilized or if sufficient air is not incorporated during batter mixing, the ultimate cake ordinarily will have a relatively low specific volume and a coarse grain structure. Thus, the shortenings of Saslaw U.S. Pat. No. 3,295,986 which contain ester of propylene glycol derived from triple pressed stearic acid (weight ratio of stearic acid to palmitic acid equal to 0.82:1) is significantly inferior to the shortenings of the present invention so far as ultimate cake specific volume and grain structure are concerned.

It is preferred when formulating a shortening for use as an ingredient for either yellow cakes or devils's food cakes, that the emulsifier component contain from 2 to 25 percent behenic acid ester chains (expressed as acids) by weight of its total acid ester chains (expressed as acids), very preferably 3 to 15 percent behenic acid ester chains. This level of behenic acid ester chains aids batter stability during baking for these types of cakes and results in even higher specific volumes than if this level of behcnic substituted emulsifier can also desirably be used in white cakes.

Examples of excellent shortenings within the scope of the present invention are as follows:

SHORTENING NO. 1

| Ingredients | Percent By Weight |
| --- | --- |
| Soybean oil having an SCI value at 70° F. of 11 | 30 |
| Soybean oil having an SCI value at 70° F. of 44 | 49 |
| Cottonseed stearin hydrogenated to an IV of 8 | 3 |
| Crude propylene glycol monoester derived from palm oil hydrogenated to an IV of 3* | 14 |
| Crude monoglycerides derived from rapeseed oil hydrogenated to an IV of 8 | 4 |

*This product is prepared by interesterifying palm oil which has already been hydrogenated to an IV of 3 with propylene glycol; the interesterification is carried out utilizing a mole ratio of propylene glycol to hydrogenated palm oil of 0.1, a reaction temperature of 400° F., and sodium hydroxide as a catalyst.

**This product is prepared by superglycerinating rapeseed oil which has already been hydrogenated to an IV of 8: the superglycerination is carried out utilizing a mole ratio of glycerine to hdyrogenated rapeseed oil of 0.2, a reaction temperature of 330° F., and sodium hydroxide as a catalyst.

This shortening has an SCI value of 31.9 at 70° F., 24.0 at 80° F., 12.4 at 92° F. and 3.7 at 105° F., and has an SCI spread of 19.5 units between 70° F. and 92° F. The basestock component in the shortening amounts to 82.5 percent by weight of the shortening; it contains the soybean oil constituents and also the diglyceride, the propylene glycol diester and free fatty acid components from the crude propylene glycol monoester and monoglyceride. The basestock triglyceride constituent in this shortening is estimated to have an SCI value of 30 at 70° F., 25 at 80° F., 10 at 92° F, and 1 at 105° F. The hardstock triglyceride in the shortening which is not only the cottonseed stearin but also the triglyceride impurity in the crude propylene glycol monoester and crude rapeseed oil monoglyceride amounts to approximately 5.3 percent by weight of the shortening. The shortening comprises by weight 12.2 percent emulsifier component of which approximately 9.1 percent by weight of the shortening is propylene glycol monoester, and approximately 3.1 percent by weight of the shortening is monoglyceride counting the monoglyceride in both the crude monoglyceride and in the crude propylene glycol monoester. Both the propylene glycol monoester and the monoglyceride have essentially all of their fatty acid ester chains saturated; these chains contain 14 to 22 carbon atoms. Thus, the emulsifier component which is both the propylene glycol monoester and also the monoglyceride consists by weight of 74.5 percent propylene glycol monoester and 25.5 percent monoglyceride. The propylene glycol monoester has 95 percent by weight of its fatty acid ester chains expressed as acids derived either from stearic acid or from palmitic acid, with the weight ratio of stearic acid ester chains (expressed as acids) to palmitic acid ester chains (expressed as acids) being 1.4:1. Moreover, the emulsifier component, that is the propylene glycol monoester and monoglyceride, contains 10 percent behenic acid ester chains (expressed as acids) by weight of its total acid ester chains (expressed as acids).

SHORTENING NO. 2

| Ingredients | Percent by Weight |
| --- | --- |
| Tallow | 39.5 |
| Soybean oil having an SCI value of 44 at 70° F. | 39.5 |
| Cottonseed stearin hydrogenated to an IV of 8 | 3 |
| Crude propylene glycol monoester derived from palm oil hydrogenated to an IV of 3 (for preparation, see Shortening No. 1) | 14 |
| Crude propylene glycol monoester derived from rapeseed oil hydrogenated to an IV of 8* | 4 |

*This product is prepared by interesterifying rapeseed oil which has already been hydrogenated to an IV of 8 with propylene glycol; the interesterification is carried out utilizing a mole ratio of propylene glycol to hydrogenated rapeseed oil of 0.1, a reaction temperature of 400° F., and sodium hydroxide as a catalyst.

This shortening has an SCI value of 25.2 at 70° F., 18.3 at 80° F., 9.3 at 92° F., and 2.0 at 105° F., and has an SCI spread between 70° F. and 92° F. of 15.9 units. The basestock component in the shortening amounts to 81.2 percent by weight of the shortening; it contains the tallow and soybean oil and also the diglyceride, propylene glycol diester and free fatty acid components from the crude propylene glycol monoester. The basestock triglyceride constituent in this shortening is estimated to have an SCI value of 28 at 70° F., 24 at 80° F. and 3 at 105° F. The hardstock triglyceride in the shortening which is not only the cottonseed stearin but also the triglyceride in the crude propylene glycol monoester amounts to approximately 4.4 percent by weight of the shortening. The emulsifier component amounts to approximately 13.9 percent by weight of the shortening including 11.7 percent by weight of the shortening of propylene glycol monoester, and 2.2 percent by weight of the shortening of monoglyceride which is present in the crude propylene glycol monoester. Both the propylene glycol monoester and the monoglyceride have essentially all of their fatty acid ester chains saturated; these chains contain 14 to 22 carbon atoms. The emulsifier component consists by weight of 84 percent propylene glycol monoester and 16 percent monoglyceride. The propylene glycol monoester has 85 percent by weight of its fatty acid ester chains derived either from stearic acid or palmitic acid, with the weight ratio of stearic acid ester chains (expressed as acids) to palmitic acid ester chains (expressed as acids) being 1.9:1. Morevoer, the emulsifier component contains 10 percent behenic acid ester chains (expressed as acids) by weight of its total acid ester chains (expressed as acids).

The novel shortenings of this invention can be prepared utilizing the above components by simply forming a uniform admixture of the components. If desired, it can be prepared in plastic form by any convenient method for preparing a plastic shortening; suitable techniques for forming plastic shortenings as described, for example, in Bailey, *Industrial Oil and Fat Products* at page 1064 *et seq.* (3d ed. 1964).

Turning now to dry prepared cake mixes which contain as a shortening ingredient the shortenings of the present invention, the particular formulation of a cake mix depends on the type of cake for which its use is intended. There are three basic types of cakes, that is, white, yellow, and devils's food. These types of cakes have the following formulations:

Dry Prepared Mix for White-Type Cakes

| Ingredients | Percent By Weight |
| --- | --- |
| Flour | 40–50 |
| Sugar | 30–50 |
| Shortening | 8–12 |
| Leavening soda | 0.9–1.5 |
| Leavening acid | 0.9–2.0 |
| Salt | 0–2.0 |
| Nonfat dry milk solids and water binders | 0–6.0 |
| Flavoring, coloring | Balance |

Dry Prepared Mix for Yellow-Type Cakes

| Ingredients | Percent By Weight |
| --- | --- |
| Flour | 40–50 |
| Sugar | 30–50 |
| Shortening | 8–12 |
| Leavening soda | 0.8–1.5 |
| Leavening acid | 0.8–1.5 |
| Salt | 0–2.0 |
| Egg solids | 0–5.0 |
| Nonfat dry milk solids and water binders | 0–5.0 |
| Flavoring, coloring | Balance |

Dry Prepared Mix for Devil's Food-Type Cakes

| Ingredients | Percent By Weight |
| --- | --- |
| Flour | 30–40 |
| Sugar | 30–45 |
| Shortening | 9–15 |
| Leavening soda | 1.5–3.0 |
| Leavening acid | 0.1–1.5 |
| Cocoa | 2.0–8.0 |
| Nonfat dry milk solids and water binders | 0–8.0 |
| Salt | 0–2.0 |
| Flavoring, coloring | Balance |

A wide assortment of cake mixes can be prepared from the basic types disclosed above by varying the flavor, color and other minor constituents. For example, spice, lemon, orange, caramel, marble, mint, cherry, Swiss chocolate, and coconut cake mixed can all be prepared utilizing the basic formulas set forth above.

The flour ingredient can be the usual soft cake flour, preferably containing at least 50 percent by weight wheat flour. Small proportions, for example, up to 10 percent by weight of the flour, can be of the high protein variety and/or starch.

The sugar can be any of the commonly used granular sugars such as sucrose, dextrose, maltose, fructose, lactose, and brown and invert sugars. The sugar can also be in powder form. Mixtures of more than one type of sugar can be used. Sucrose and dextrose, alone or in admixture, are the preferred sugars for use herein.

The shortening ingredient has been described in detail hereinbefore.

The leavening soda ingredient can be any of those commonly used such as, for example, sodium, potassium or ammonium bicarbonate.

Suitable leavening acids include, for example, monocalcium phosphate, dicalcium phosphate, sodium acid pyrophosphate, potassium acid tartrate, monosodium phosphate, sodium aluminum phosphate, and sodium aluminum sulfate.

Suitable water binders can include natural gum materials such as guar gum, gum tragacanth, locust bean gum, algin, gelatin, Irish Moss, pectin, and gum arabic. Synthetic binder materials such as water-soluble salts of carboxymethyl cellulose can also be used.

The dry prepared cake mixes of this invention are conveniently prepared, for example, by blending sugar, flour and the shortening of this invention into a homogenous premix in a paddle mixer, and then passing this premix through a four-roll mill. The remaining ingredients can then be added. This combination can be mixed in a paddle mixer or ribbon mixer and then passed through an entoleter to form a smooth, free-flowing finished mix. This method of preparing a dry prepared mix is disclosed in U.S. Pat. Nos. 2,874,051–053. Another preferred method of preparing these dry mixes is disclosed in Cooke, U.S. Pat. application, Ser. No. 759,795, filed Sept. 13, 1968, and now abandoned.

The mixes are conveniently prepared into cakes by forming a batter by mixing the dry mix in a household electric mixer, for example, for 2 minutes at medium or high speed, after having added water or other aqueous liquid and eggs or egg whites to the mix. The batter resulting from the mixing process is poured into a cake pan and baked, for example, for 25 to 40 minutes at 350° F to 425° F.

The mixes as a result of their containing the shortening ingredient of this invention are shelf stable; in other words, the mixes containing the shortening of the present invention can be utilized to prepare excellent cakes (that is, cakes with high specific volume and fine grain structure and moist and rapid melt-in-the-mouth eating quality) even though the mixes have been stored, for example, on store shelves and in warehouses, for more than 12 months at temperatures up to 100° F. The mixes produce batters which during batter mixing readily incorporate air, and the aerated batter emulsion remains stable during baking so as to provide a high specific volume, fine grain structure cake. In particular, for yellow cakes, specific volumes ranging from 5.9 to 6.1 cubic centimeters per gram of dry mix are readily achieved; for white cakes, cake specific volumes ranging from 5.7 to 6.1 cubic centimeters per gram of dry mix are readily achieved. The baked cakes resulting from the mixes of this invention have a very moist eating quality and give a melt-in-the-mouth eating effect.

The following examples illustrate the use of previously mentioned Shortening No. 1 and previously mentioned Shortening No. 2 in yellow cake and devil's food cake dry prepared dry mixes, and the use of another shortening within the scope of the invention in white cake dry prepared mix. The examples further illustrate that the mixes are shelf stable and are used to produce ultimate cakes of high specific volume, fine grain structure, moist eating quality and melt-in-the-mouth eating quality.

In these examples, the shortening ingredients are not plasticized.

In the examples, the showing that the mixes produce consumer-acceptable cakes even after the mixes have been stored for 3 months at 100° F. indicates that the mixes are shelf stable to the extent that they can be stored on store shelves or in warehouses for more than 12 months at temperatures up to 100° F.

EXAMPLE I

Yellow Cake

A yellow-type dry mix having the following composition is prepared:

| Ingredient | Percent By Weight |
|---|---|
| Sugar (industrial fine granulated sucrose) | 45.2040 |
| Wheat flour | 41.0945 |
| Shortening No. 1 previously mentioned | 9.0000 |
| Dextrose | 1.00 |
| Sodium bicarbonate | 0.95 |
| Sodium aluminum phosphate | 0.95 |
| Salt | 0.75 |
| Modified starch | 0.50 |
| Guar gum | 0.30 |
| Flavor and color | 0.2515 |
| | 100.00 |

The mix is prepared by blending together thoroughly the sucrose, flour and shortening in a paddle mixer and then passing the blend through a roller mill. After the milling step, the remaining ingredients are added, mixed in a paddle mixer, and then subjected to entoleting.

Batter is prepared by adding two whole eggs and 1⅓ cups of water to 18.7 ounces (531 grams) of mix. The batter is then mixed utilizing a conventional household electric mixer for 2 minutes at medium speed (450 r.p.m. under load). 463 grams of batter is then filled into an 8-inch round cake pan and baked at 350° F. for 32 minutes. After cooling for 30 seconds, the center height and edge height of the cake are measured; the center height is 2.37 inches and the edge height is 2.04 inches. The cake has a specific volume, that is, volume in cubic centimeters per gram of dry prepared mix utilized, of 6.0. The cake has a fine grain structure. The center height, edge height, specific volume and grain structure indicate that the emulsifier component in the shortening aids substantially in the incorporation of air in the batter during mixing and stabilizes the aerated batter emulsion during baking. The baked cake has an excellent eating quality in that it has a moist taste and gives a rapid melt-in-the-mouth eating effect. The dry prepared mix is very shelf stable in that it gives consumer-acceptable volume, grain structure, and eating quality results even after storage for 3 months at 100° F.

EXAMPLE II

Devil's Food Cake

The devil's food-type prepared cake mix having the following composition is prepared by the mix preparing method described in example I:

| Ingredient | Percent By Weight |
|---|---|
| Sugar (industrial fine granulated sucrose) | 35.734 |
| Wheat flour | 32.458 |
| Shortening | 11.00 |
| Dextrose | 4.50 |
| Sodium bicarbonate | 2.60 |
| Sodium aluminum phosphate | 0.35 |
| Monocalcium phosphate | 0.15 |
| Salt | 1.00 |
| Modified starch | 0.40 |
| Nonfat milk solids | 0.50 |
| Pregelatinized cornstarch | 1.00 |
| High protein wheat flour | 1.50 |
| Wheat starch | 2.00 |
| Guar gum | 0.20 |
| Lactose | 0.50 |
| Cocoa | 5.00 |
| Flavor | 0.081 |
| | 100.00 |

The shortening ingredient in the above mix contains by weight 28.34 percent soybean oil having a solids content index value of 11 at 70° F., 47.26 percent soybean oil having a solids content index value of 44 at 70° F, 2.90 percent cottonseed stearin having an IV of 8, 17.00 percent crude propylene glycol monoester derived from palm oil hydrogenated to an IV of 3 (for preparation, see Shortening No. 1 hereinbefore), and 4.50 percent crude rapeseed oil monoglyceride hydrogenated to an IV of 8 (for preparation, see Shortening No. 1 hereinbefore). This shortening has an SCI value of 31.9 at 70° F., of 24.0 at 80° F., of 12.8 at 92° F, of 3.7 at 105° F., and has an SCI spread of 19.1 units between 70° F and 92° F. The basestock component of the shortening amounts to 79.8 percent by weight of the shortening. The basestock component is the combination of soybean oil having a solids content index value of 11 at 70° F. and soybean oil having a solids content index value of 44 at 70° F. and also the diglyceride, propylene glycol diester and free fatty acid components from the crude propylene glycol monoester and monoglyceride. The basestock triglyceride constituent is estimated to have an SCI value of 30 at 70° F., 25 at 80° F., 10 at 92° F. , and 1 at 105° F. The hardstock triglyceride in the shortening which is not only the cottonseed stearin but also the triglyceride in the crude propylene glycol monoester and crude monoglyceride amounts to 5.6 percent by weight of the shortening. The emulsifier component amounts to approximately 14.6 percent by weight of the shortening including 11.0 percent propylene glycol monoester by weight of the shortening and 3.6 percent monoglyceride by weight of the shortening. (2.0 percent monoglyceride by weight of the shortening is in the crude propylene glycol monoester and 1.6 percent monoglyceride by weight of the shortening is in the crude monoglyceride.) Both the propylene glycol monoester and the monoglyceride have essentially all of their fatty acid ester chains saturated; these chains contain 14 to 22 carbon atoms. The emulsifier component consists by weight of 75 percent propylene glycol monoester and 25 percent monoglyceride. The propylene glycol monoester has 95 percent by weight of its fatty acid ester chains (expressed as acids) derived either from stearic acid or palmitic acid, with the weight ratio of stearic acid ester chains (expressed as acids) to palmitic acid ester chains (expressed as acids) being 1.4:1. Moreover, the emulsifier component contains 8 percent behenic acid ester chains (expressed as acids) by weight of its total acid ester chains (expressed as acids).

Batter is prepared from the above-described mix by adding two whole eggs and 1½ cups of water to 18.7 ounces (531 grams of the mix). The batter is mixed with a conventional household electric mixer for 2 minutes at medium speed (450 r.p.m. under load). 483 grams of batter is then added into an 8-inch round cake pan and then baked for 35 minutes at 350° F. After cooling for 30 seconds, the center height and edge height of the cake is measured; the center height is 2.38 inches and the edge height is 1.90 inches. The cake has a specific volume, that is, volume in cubic centimeters per gram of dry prepared mix utilized, of 6.0. The cake has a fine grain structure. The center height edge height, specific volume and grain structure indicate that the emulsifier component in the shortening aids substantially in the incorporation of air in the batter during mixing and stabilized the aerated batter emulsion during baking. The baked cake has an excellent eating quality in that it has a moist taste and gives a rapid melt-in-the-mouth eating effect. The dry prepared mix is very shelf stable in that it gives consumer-acceptable volume, grain structure and eating quality results even after storage for 3 months at 100° F.

EXAMPLE III

White Cake

A white-type dry prepared cake mix having the following composition is prepared by the mix preparing method described in example I.

| Ingredient | Percent by Weight |
|---|---|
| Wheat flour | 41.345 |
| Sugar (industrial fine granulated sucrose) | 38.445 |
| Shortening | 10.20 |
| Dextrose | 2.00 |
| Salt | 0.75 |
| Sodium aluminum phosphate | 0.95 |
| Sodium bicarbonate | 0.945 |
| Nonfat milk solids | 2.00 |
| Wheat starch | 3.00 |
| Guar gum | 0.05 |
| 2Flavor | 0.30 |
| Sodium saccharin | 0.015 |
| | 100.00 |

The shortening ingredient in the above mix contains by weight 31.43 percent soybean oil having a solids content index value of 11 at 70° F., 52.41 percent soybean oil having a solids content index value of 44 at ° F., 3.21 percent cottonseed stearin hydrogenated to an IV of 8, 12.50 percent crude propylene glycol monoester derived from palm oil hydrogenated to an IV of 3 (for preparation, see Shortening No. 1 hereinbefore), and 0.45 percent stearic acid. This shortening is estimated to have an SCI value of 32 at 70° F., of 25 at 80° F., of 14 at 92° F., of 5 at 105° F., and an SCI spread of 18 units between 70°and 92° F. The basestock component of the shortening amounts to 86.2 percent by weight of the shortening; it contains the soybean oil having a solids content index value of 11 at 70° F. and also the diglyceride, propylene glycol diester and free fatty acid components from the crude propylene glycol monoester. The basestock triglyceride constituent is estimated to have an SCI value of 30 at 70° F., 25 at 80° F., 10 at 92° F. and 1 at 105° F. The hardstock triglyceride in the shortening which is not only the cottonseed stearin but also the triglyceride in the crude propylene glycol monoester amounts to 4.2 percent by weight of the shortening. The emulsifier component amounts to approximately 9.6 percent by weight of the shortening including 8.1 percent propylene glycol monoester by weight of the shortening and 1.5 percent monoglyceride by weight of the (the monoglyceride is in the crude propylene glycol monoester). Both the propylene glycol monoester and the monoglyceride have essentially all of their fatty acid ester chains saturated; these chains contain 14 to 22 carbon atoms. The emulsifier component consists by weight of 84 percent propylene glycol monoester and 16 percent monoglyceride. The propylene glycol monoester has 95 percent by weight of its fatty acid ester chains (expressed as acids) derived either from stearic acid, with the weight ratio of stearic acid ester chains (expressed as acids) to palmitic acid ester chains (expressed as acids) being 1.4:1. The emulsifier component contains no behenic acid ester chains.

Batter is prepared from the above-described mix by adding egg whites from two eggs and also 1⅓cups of water to 18.7 ounces (531 grams) of the mix. The batter is mixed with a conventional household electric mixer for 2 minutes at high speed (approximately 810 r.p.m. at no load), followed by 1 minute at medium speed (450 r.p.m. under load). 463 grams of the batter is than added into an 8-inch round cake pan and then baked for 27 minutes at 350° F. After cooling for 30 seconds, the center height and edge height of the cake are measured; the center height is 2.33 inches and the edge height is 1.78 inches. The cake has a specific volume, that is, volume in cubic centimeters per gram of dry prepared mix utilized, of 5.75 . The cake has a fine grain structure. The center height, edge height, specific volume, and grain structure indicate that the emulsifier component in the shortening aids substantially in the incorporation of air in the batter during mixing and stabilizes the aerated batter emulsion during baking. The baked cake has an excellent eating quality in that it has a moist taste and gives a rapid melt-in-the-mouth eating effect. The dry prepared mix is very shelf stable in that it gives consumer-acceptable volume, grain structure and eating quality results even after storage for 3 months at 100° F.

When in example I an equal percentage of Shortening No. 2 previously described hereinbefore is substituted for Shortening No. 1 used therein, substantially the same shelf stability, specific volume, grain structure and eating quality results are achieved as are achieved in example I.

When in example II, an equal percentage of Shortening No. 1 or Shortening No. 2 are substituted for the shortening ingredient utilized therein, substantially the same shelf stability, specific volume, grain structure and eating quality results are achieved as are achieved in example II.

When in examples I, II or III, an equal weight of palm oil hydrogenated to an iodine value of 3 or cottonseed oil hydrogenated to an iodine value of 3 or cottonseed oil hydrogenated to an iodine value of 8 is substituted for the cottonseed stearin therein, substantially the same shelf stability, specific volume, grain structure and eating quality results are achieved compared to where cottonseed stearin is utilized.

What is claimed is:

1. A shortening for use in dry prepared cake mixes to provide good mix keeping qualities, good air incorporation during batter mixing, good batter stability during baking and a melt-in-the-mouth eating quality and a moist eating quality in the ultimate cake, said shortening having a solids content index value ranging from 10 to 40 at 70° F., 10 to 30 at 80° F., 5 to 20 at 92° F., and 0.5 to 10 at 105° F. and having a solids content index value spread between 70° F. and 92° F. of at least 8 SCI units said shortening comprising, by weight A. from 67 to 94 percent of basestock component consisting essentially of triglyceride constituent, said triglyceride constituent having a solids content index value ranging from 10 to 40 at 70° F., 5 to 35 at 80° F., 0.5 to 25 at 92° F., and 0 to 10 at 105° F.;

B. from 1 to 8 percent of triglyceride hardstock component, said component having an iodine value less than 10; and C. from 5 to 25 percent of emulsifier component, said emulsifier component consisting essentially by weight of from 50 to 100 percent of monoester of propylene glycol with saturated fatty acid having from 12 to 22 carbon atoms in each of the fatty acid ester chains and from 0 to 50 percent fatty monoglyceride having saturated fatty acid ester chains and from 12 to 22 carbon atoms in each of these fatty acid ester chains, said monoester of propylene glycol having at least 60 weight percent of its fatty acid ester chains expressed as acids either derived from stearic acid or from palmitic acid with the weight ratio of stearic acid ester chains expressed as acids to palmitic acid ester chains expressed as acids ranging from 1:1 to 2.5:1.

2. The shortening of claim 1 wherein the fatty acid ester chains of the propylene glycol monoester and fatty monoglyceride have from 14 to 22 carbon atoms and the monoester of propylene glycol has at least 80 weight percent of its fatty acid ester chains expressed as acids either derived from stearic acid or palmitic acid.

3. The shortening of claim 2 which has solids content index values ranging from 15 to 35 at 70° F., 12 to 28 at 80° F., 5 to 20 at 92° F., and 1 to 6 at 105° F., and has a solids content index value spread between 70° F and 92° F. of at least 10 SCI units.

4. The shortening of claim 3, said shortening comprising, by weight from 74 to 92 percent of basestock component.

5. The shortening of claim 4, said shortening comprising by weight from 2 to 6 percent of triglyceride hardstock component.

6. The shortening of claim 5, said shortening comprising by weight from 6 percent to 20 percent emulsifier component.

7. The shortening of claim 6 wherein said triglyceride hardstock component comprises palm oil, cottonseed oil ro cottonseed stearin each with an iodine value less than 10.

8. The shortening of claim 6 wherein said emulsifier component comprises propylene glycol monoester derived from palm oil hydrogenated to an IV less than 10, propylene glycol monoester derived from rapeseed oil hydrogenated to an IV less than 10 or monoglyceride derived from rapeseed oil hydrogenated to an IV of less than 10.

9. The shortening of claim 6 wherein said monoester of propylene glycol has a weight ratio of stearic acid ester chains expressed as acids to palmitic acid ester chains expressed as acids ranging from 1.2:1 to 2:1.

10. The shortening of claim 1 wherein said emulsifier component contains from 2 percent to 25 percent behenic acid ester chains expressed as acids by weight of its total acid ester chains expressed as acids.

11. The shortening of claim 5 wherein said emulsifier component contains from 3 to 15 percent behenic acid ester chains expressed as acids by weight of its total acid ester chains expressed as acids.

12. A dry prepared mix for white-type cakes, said mix comprising by weight from 8 to 12 percent of the shortening of claim 1.

13 A dry prepared mix for yellow-type cakes, said mix comprising by weight from 8 to 12 percent of the shortening of claim 1.

14. A dry prepared mix for devil's food-type cakes, said mix comprising by weight from 9 to 15 percent of the shortening of claim 1.

* * * * *

UNITED STATES PATENT OFFICE
CERTIFICATE OF CORRECTION

Patent No. 3,622,345     Dated November 23, 1971

Inventor(s) Monoj K. Gupta

It is certified that error appears in the above-identified patent and that said Letters Patent are hereby corrected as shown below:

IN THE SPECIFICATION:

| | | |
|---|---|---|
| Col. 1, | lines 30 and 31 | "U.S. Pat. Nos. 3,145,107, 3,145,109" should read -- U.S. Pat. Nos. 3,145,107-9 -- |
| | line 63 | "ingredients" should be -- ingredient -- |
| | line 69 | delete "the" |
| | line 75 | before "for use in a dry prepared" insert -- of baked cakes produced utilizing emulsified shortenings. It is an object of this invention to provide a shortening suitable -- |
| Col. 2, | line 1 | after "provide" insert -- good -- |
| Col. 3, | line 23 | before "processing" insert -- and -- |
| Col. 4, | line 37 | "monester" should be -- monoester -- |
| | line 42 | "terestification" should be -- teresterification -- |
| Col. 5, | line 45 | "devils's" should be -- devil's -- |
| | line 52 | "behcnic" should be -- behenic -- |
| Col. 6, | line 64 | "81.2" should be -- 81.7 -- |
| Col. 7, | line 12 | "Morevoer" should be -- Moreover -- |

FO-1050
(5/69)

UNITED STATES PATENT OFFICE
CERTIFICATE OF CORRECTION

Page 2 of 3

Patent No. 3,622,345  Dated  November 23, 1971

Inventor(s) Monoj K. Gupta

It is certified that error appears in the above-identified patent and that said Letters Patent are hereby corrected as shown below:

| | |
|---|---|
| Col. 7, line 21 | "as described" should be -- are described -- |
| line 27 | "devils's" should be -- devil's -- |
| Col. 8, line 3 | "mixed" should be -- mixes -- |
| line 62 | delete "white" and insert -- devil's food --; delete "cake" |
| line 64 | delete the period after "achieved" and insert -- ; for white cakes, cake specific volumes ranging from 5.5 to 6.0 cubic centimeters per gram of dry mix are readily achieved. -- |
| line 69 | delete "dry", second occurrence. |
| Col. 9, line 32 | insert -- the -- before "mix" |
| line 58 | "32.458" should read -- 32.485 -- |
| Col. 10, line 6 | "5.00" should read -- 6.00 -- |
| line 65 | "is measured" should read -- are measured -- |
| line 72 | "stabilized" should be -- stabilizes -- |
| Col. 11, line 17 | "2Flavor" should be -- Flavor -- |
| line 23 | "°F.," should read -- 70°F., -- |

PO-1050
(5/69)

UNITED STATES PATENT OFFICE
CERTIFICATE OF CORRECTION

Page 3 of 3

Patent No. 3,622,345                    Dated November 23, 1971

Inventor(s) Monoj K. Gupta

It is certified that error appears in the above-identified patent and that said Letters Patent are hereby corrected as shown below:

Col. 11, line 33    after "70°F." insert -- and soybean oil having a solids content index value of 44 at 70°F -- line 44    after "by weight of the" insert -- shortening -- line 52    after "stearic acid" insert -- or palmitic acid --

Col. 12, line 20    delete entire line

IN THE CLAIMS:

Col. 13, line 2    "ro" should be -- or --

Signed and sealed this 13th day of June 1972.

(SEAL)
Attest:

EDWARD M. FLETCHER, JR.
Attesting Officer

ROBERT GOTTSCHALK
Commissioner of Patents